United States Patent [19]

Elings et al.

[11] Patent Number: 5,077,473
[45] Date of Patent: Dec. 31, 1991

[54] DRIFT COMPENSATION FOR SCANNING PROBE MICROSCOPES USING AN ENHANCED PROBE POSITIONING SYSTEM

[75] Inventors: Virgil B. Elings; John A. Gurley; Mark R. Rodgers, all of Santa Barbara, Calif.

[73] Assignee: Digital Instruments, Inc., Santa Barbara, Calif.

[21] Appl. No.: 558,225

[22] Filed: Jul. 26, 1990

[51] Int. Cl.⁵ .............................................. H01J 37/26
[52] U.S. Cl. ..................................... 250/306; 250/307
[58] Field of Search ..................... 250/306, 307, 442.1; 73/105; 310/317, 315; 374/6

[56] References Cited

U.S. PATENT DOCUMENTS 3,916,226 10/1975 Knoll ................................... 310/317

OTHER PUBLICATIONS

Pohl et al., Rev. Sci. Instrum. 59(6), Jun. 1988, pp. 840-842.
Wickramasinghe, Scientific American, Oct. 1989, pp. 98-105.

Primary Examiner—Jack I. Berman
Attorney, Agent, or Firm—Donald A. Streck

[57] ABSTRACT

This invention is an enhanced probe positioning technique for Scanning Tunneling Microscopes, Atomic Force Microscopes, and other scanning probe microscopes. The invention has particular application for drift compensation. The invention adds a controllable motion to the probe that is totally independent of the scanning or other probe positioning. If the drift velocity is known, the invention can be used to compensate for the drift. In addition, several implementations are shown for measuring drift velocity. One method has the operator identify a significant feature of the acquired image on separate frames of data. The shift of this pattern or feature, along with the time between frames, can be used to calculate the drift velocity. Two methods are described that utilize the frequency shift of the image spatial spectrum due to the effect of the drift velocity on bi-directional scans. Another method is described that derives drift velocity and direction from the correlation of separate frames of data. The invention can also be used to compensate for predicted drift, such as the drift after a scan area offset.

17 Claims, 3 Drawing Sheets

DRIFT COMPENSATION FOR SCANNING PROBE MICROSCOPES USING AN ENHANCED PROBE POSITIONING SYSTEM

BACKGROUND OF THE INVENTION

The present invention relates to probe positioning and drift compensation for scanning tunneling microscopes, atomic force microscopes, and the other scanning probe microscopes; and, more specifically, in a scanning system wherein a probe carried by positioning apparatus is positioned in at least two perpendicular dimensions by the application of a positioning signal from a positioning generator to the positioning apparatus for each of the two dimensions, to apparatus for providing supplemental movement to the probe comprising, a supplemental signal generator providing supplement signals to the positioning apparatus which supplemental signals define supplemental motion and which supplemental signals may be simultaneously applied to the positioning apparatus in conjunction with positioning signals.

Scanning Probe Microscopes are instruments that provide high resolution information about the properties of surfaces. One common use of these devices is imaging, and some types of SPM have the capability of imaging individual atoms. Along with images, SPMs can be used to measure a variety of surface properties, with detail over the range from a few angstroms to hundreds of microns. For many applications, SPMs can provide lateral and vertical resolution that is not obtainable from any other type of device.

The first type of SPM developed was the scanning tunneling microscope (STM). The STM places a sharp, conducting tip near a surface. The surface is biased at a potential relative to the tip. When the tip is brought near the surface, a current will flow in the tip due to the tunneling effect. Tunneling will occur between the atom closest to the surface in the tip and the atoms on the surface. This current is a function of the distance between the tip and the surface, and typically the tip has to be within 20 angstroms of the surface for measurable current to be present. An STM has a mechanism to scan the tip over the surface, typically in a raster pattern. While the tip is scanned over the surface, the tip is kept at a constant distance above surface features by means of a feedback loop employing the tunneling current and a vertical position controlling mechanism. The feedback loop adjusts the vertical position of the tip to keep the tunneling current, and thus the distance, constant. The vertical position of the tip is determined from the control signals applied to the vertical position controlling mechanism. The vertical position, as a function of horizontal scan position produces a topographic map of the surface. STMs can easily image individual atoms, and can also be used for highly accurate surface measurements of larger scale, up to a few hundred microns. STMs also may be used for data other than topographic images. One alternative operation of an STM is to hold the tip stationary while varying the bias voltage applied to the sample and monitoring the tunneling current, thus measuring local current/voltage characteristics of the surface. STMs require a conducting sample surface for operation. Insulating surfaces may be coated with a thin conducting material such as gold, or in some cases, insulating materials a few molecules thick lying on a a conducting surface may be imaged.

Another SPM, the atomic force microscope (AFM), similarly scans a tip across a surface. The tip in this case is mounted on the free end of a lever or cantilever which is fixed at the other end. The tip is brought to a surface such that the force interaction of the tip with the surface causes the cantilever to deflect. A feedback loop employing the cantilever deflection information and the tip or sample's vertical position can be used to adjust the vertical position of the tip as it is scanned. The feedback loop keeps the deflection, and thus the force, constant. The tip vertical position versus horizontal scan provides the topographic surface map. In this mode, the forces on the surface can be made very small, so small as not to deform biological molecules. AFMs can also be operated in a mode where the repulsive force deflects the cantilever as it scans the surface. The deflection of the tip as it is scanned provides topographic information about the surface. AFMs may also be operated in a non-contact mode where the cantilever is vibrated and the Van der Waals interaction between the tip and surface can affect the vibration frequency or amplitude. AFMs have a means to detect the small movements of the cantilever. Several means for cantilever motion detection have been used with the most common method employing reflected light from the cantilever. The deflection of a light beam due to the cantilever motion may be detected, or the movement of the cantilever can be used to generate interference effects which can be used to derive the motion. Like an STM, AFMs can image individual atoms; but, unlike STMs, AFMs can be used for non-conducting surfaces. AFMs may also be used for measurements such as surface stiffness.

Other SPMs may use different probing mechanisms to measure properties of surfaces. Probing devices have been developed for such properties as electric field, magnetic field, photon excitation, capacitance, and ionic conductance. Whatever the probing mechanism, most SPMs have common characteristics, typically operating on an interaction between probe and surface that is confined to a very small lateral area and is extremely sensitive to vertical position. Most SPMs possess the ability to position a probe very accurately in three dimensions and use high performance feedback systems to control the motion of the probe relative to the surface.

The positioning and scanning of the probe is usually accomplished with piezoelectric devices. These devices expand or contract when a voltage is applied to them and typically have sensitivities of a few angstroms to hundreds of angstroms per volt. Scanning is implemented in a variety of ways. Some SPMs hold the probe fixed and attach the sample to the scanning mechanism while others scan the probe. Piezoelectric tubes have been found to be the best scanning mechanism for most applications. These tubes are capable of generating three dimensional scans. They are mechanically very stiff, have good frequency response for fast scans, and are relatively inexpensive to manufacture and assemble. Such scanners are used in commercial STMs and AFMs sold by the assignee of this Application, Digital Instruments Inc., under the trademark NanoScope. These scanners are made in various lengths, the longer ones having larger scan ranges.

Figure 1:
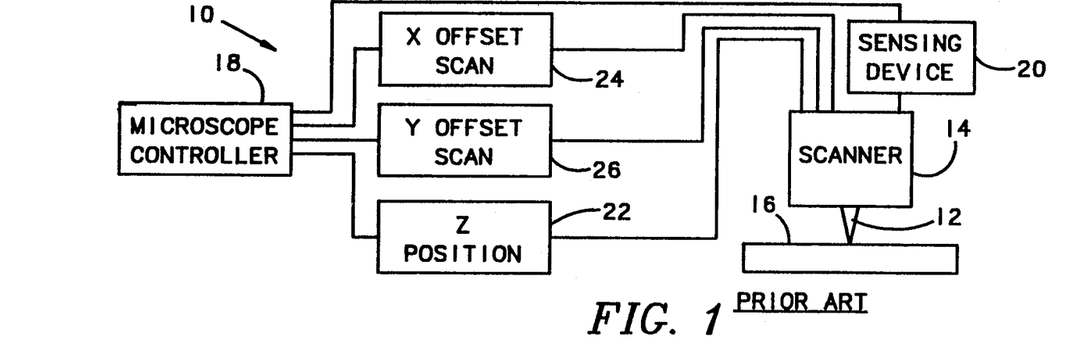
FIG. 1 is a block diagram of the probe tip positioning system in a prior art scanning probe microscope.

FIG. 1 is a simplified block diagram of a typical scanning probe microscope 10. The probe tip 12 is positioned by a piezoelectric scanner 14 over a stationary sample 16; or, in some cases the sample 16 is attached to the scanner 14 and the tip 12 is stationary. The controller 18 acquires data from the sensing device 20 and through feedback controls the height of the tip 12 by applying control voltages to the scanner 14 through the z position driver 22. The sensing device 20 senses tunneling current in the case of an STM, tip deflection in the case of an AFM, or other parameters for other scanning probe microscopes. The x and y positions are controlled by applying voltages to the scanner through the x and y drivers 24 and 26. Typically for most applications, a raster scan is generated by producing a linear motion in the x and y scan directions. The scan area can be offset by starting the raster from a selected position within the scanner range. The probe tip 12 in this arrangement can be positioned anywhere in x and y within the range of the scanner.

In existing scanning probe microscopes, drift of the probe tip across the sample is a significant effect. The drift distorts the image and also makes it difficult to continue imaging the same feature over time. Typically, drift in the x-y plane is several angstroms per minute after the set-up has stabilized. Drift can be much greater when a sample is first contacted, sometimes requiring several hours of stabilization before accurate scanning can occur. Drift is due to thermal expansion of the piezoelectric scanner as well as the sample itself and its holder. Additional drift contributions come from "creep" and hysteresis of the piezoelectric material. Some drifts, such as the drift due to thermal effects, are long-term and are typically constant over the scanning of single images. Other drifts, such as the drift due to piezoelectric creep, have time dependences on smaller scales. Existing designs attempt to minimize the drift by mechanical means, such as matching thermal coefficients for probe materials or using materials that are very stable. For instance, the most widely used STM uses Invar in its construction to minimize thermal drifts. The reliance on mechanical means to reduce drift, however, may impose restrictions on the configuration of the system which severely decrease its flexibility. Most existing general purpose designs typically achieve long-term drift velocities as low as a few angstroms per minute. It can be seen that for a typical atomic feature whose size is on the order of 10 angstroms, after a few minutes the feature will have shifted significantly in the image and in a short time will have moved out of the scan area. Short-term drifts, particularly at the beginning of scanning or after a scan area has been offset, can be of much greater magnitude and can cause image distortions on the order of the scan size. One could attempt to correct the drift effect after the data is collected, which can improve the visual quality of an image. Off-line correction, however, cannot address the problem of drifting off of a desired feature or distortions that cause features to be improperly placed either in or out of the scan area.

Therefore, drift in scanning probe microscopes restricts their ability to dwell on atomic dimension features, an ability that would be extremely useful for monitoring local processes or acquiring repeated images of unique structures. Drift also can cause inordinately long stabilization times before undistorted images can be acquired for larger images.

What is needed therefore, is an SPM which possesses the ability to generate a controlled motion of the scan area that is independent of the scanning motions and can be used to cancel the drift motion. The ability to add a controlled motion could be useful for other reasons as well. In some applications, e.g. when imaging large areas, it would be useful to move the sample at a constant velocity and also scan it while it is moving without distortion. Successive frames would smoothly and continuously image different areas of the sample. It is therefore desirable, for many reasons, to provide motion that is independent of the scanning motions for scanning probe microscopes.

Wherefore, it is an object of this invention to provide a capability for STMs, and the like, that is not dependent on the physical design of the scanner or sample holder for adding a controllable supplemental motion to the probe tip.

It is another object of this invention to provide a drift compensation capability for STMs, and the like, wherein compensation motion is independent of the raster scan or other positioning of the tip and can be a constant motion or may vary with time.

It is yet another object of this invention to provide a compensation capability for STMs, and the like, wherein the compensation motion can be used to cause the scan frame to follow the sample, whether relative motion between the sample and scan frame is unwanted drift or some desired motion.

Other objects and benefits of the invention will become apparent from the detailed description which follows hereinafter when taken in conjunction with the drawing figures which accompany it.

SUMMARY

The foregoing objects have been achieved in a scanning system wherein a probe carried by positioning apparatus is positioned in at least two perpendicular dimensions by the application of a positioning signal from a positioning generator to the positioning apparatus for each of the two dimensions, by the apparatus of the present invention for providing supplemental movement to the probe comprising, a supplemental signal generator providing supplement signals to the positioning apparatus which supplemental signals define supplemental motion and which supplemental signals may be simultaneously applied to the positioning apparatus in conjunction with positioning signals.

According to one embodiment, the application of the positioning signal to the positioning apparatus for the two dimensions is typically used to create a raster scan pattern (or other positioning pattern) of the probe over a section of a surface to be scanned; and, the positioning apparatus is a piezolectric apparatus subject to non-linear motion over a width of a scan pattern; and the method additionally comprises the step of, determining the non-linearity of the motion of the positioning apparatus over the width of a scan pattern; wherein, a step of developing a supplemental signal which defines supplemental motion in the two dimensions comprises developing supplemental signals which offset the non-linearity of the motion of the positioning apparatus over the width of a scan pattern. In one approach, the supplemental motion is produced by a non-linear waveform which is developed such that linear motion of the probe over the width of a scan pattern results. This supplemental signal is two dimensional, having two components such as x and y amplitudes or a direction and an amplitude.

In another embodiment, the application of the positioning signal to the positioning apparatus for the two dimensions is used to create a scan pattern (such as a raster scan) of the probe over a section of a surface to be scanned; and, a step of developing a supplemental signals which define supplemental motion in the two dimensions comprise developing supplemental signals which define a controlled drift in the scan pattern moving the scan pattern over a portion of the surface to be scanned. In one approach, said step of developing supplemental signals which define a controlled drift in the scan pattern includes developing as part of the supplemental signals compensation motion of the probe which compensates for motion-caused distortion whereby the probe can be used to automatically scan a large area of the surface to be scanned while high resolution is maintained.

In yet another embodiment, the application of the positioning signal to the positioning apparatus for the two dimensions is used to create a raster scan pattern (or other positioning pattern) of the probe over a section of a surface to be scanned; and, the positioning apparatus for the two dimensions is subject to unwanted long-term drift that is relatively constant over the time required to scan a single image; and the method additionally comprises the step of, measuring the unwanted long-term drift; wherein, said step of developing supplemental signals which define supplemental motion in the two dimensions comprises developing signals which offset the unwanted long-term drift.

In one approach, said step of developing supplemental signals which offset the unwanted long-term drift comprises the steps of, having an operator mark a significant feature on a scan frame at a first point in time; having the operator mark the significant feature on a later scan frame at a second point in time; and, having an electronic controller of the scanning probe microscope system calculate the drift velocity vectors of the significant feature in the two dimensions over the elapsed time between the first and second points in time.

In another approach, said step of developing supplemental signals which offset the unwanted long-term drift comprises the step of, having the operator enter compensation factors used to develop the supplemental signals; and, repeating the above step until a significant feature does not drift between first and second points in time.

In yet another approach, said step of supplemental signals which offset the unwanted long-term drift comprises the steps of, displaying data from a continuously scanned single line in one dimension; having an operator enter a first compensation factor used to develop a first supplemental signal; having the operator adjust a first compensation factor until data displayed is stationary; displaying data from a continuously scanned single line in a second dimension; having the operator enter a second compensation factor used to develop a second supplemental signal; and, having the operator adjust the second compensation factor until data displayed is stationary.

In still another approach, said step of developing supplemental signals which offset the unwanted long-term drift comprises the steps of, continuously and simultaneously displaying data from forward and reverse scans of a scanned single line in one dimension; having an operator enter a first compensation factor used to develop a first supplemental signal; having the operator adjust the first compensation factor until data displayed is stationary; continuously and simultaneously displaying data from forward and reverse scans of a scanned single line in a second dimension; having the operator enter a second compensation factor used to develop a second supplemental signal; and, having the operator adjust the second compensation factor until data displayed is stationary.

In a still further approach, said step of developing supplemental signals which offset the unwanted long-term drift comprises the steps of, continuously comparing data from forward and reverse scans of scanned lines in one dimension on a frame by frame basis; automatically adjusting a first compensation factor used to develop a first supplemental signal on a frame by frame basis so as to compensate for drift in the first dimension during the preceding frame; continuously comparing data from forward and reverse scans of scanned lines in a second dimension on a frame by frame basis; and, automatically adjusting a second compensation factor used to develop a second supplemental signal on a frame by frame basis so as to compensate for drift in the second dimension during the preceding frame. A variation additionally comprises the step of determining drift velocity from a shift in spectral frequency caused by the effect of the drift velocity on data taken from forward and reverse scans. Another variation additionally comprises the step of determining drift velocity from the shift in frequency of specific spectral peaks contained in data taken from forward and reverse scans.

DESCRIPTION OF THE PREFERRED EMBODIMENT

Prior art SPMs operate assuming that the sample is fixed relative to the probe during the data collection process and that the only relative motions are due to the scanning action. The only provision sometimes made for unwanted motion is in mechanical design features to eliminate thermal drift; and, as explained above, elimination of thermal drift by mechanical means is of limited effectiveness. No provision is made in the prior art for introducing controlled motions in addition to the scanning action. The present invention is a method and associated apparatus for introducing controlled motion that is independent of the scanning motion such that the data will be acquired as if the scan area was stationary. This motion can be implemented on the basic prior art microscope 10 of FIG. 1 in the form of supplemental motion drive waveforms computed by the controller 18 and superimposed on the raster waveforms. One could also implement the improvement of this invention employing a multiple scanner system with separate controllers—one of which provides the scanning motions and the other of which provides the superimposed supplemental motion, although this is not the preferred implementation. The preferred implementation is one in which the independent supplemental motion is superimposed on the same scanner that produces the data collection motions. The controlled, independent supplemental motion can be used to compensate for drift, or for the addition of any desired motion. In the general case, since the response of piezoelectric scanners is non-linear, the generation of a given desired supplemental motion can require a complex scan drive waveform. Therefore, the invention can be more conveniently implemented on an SPM with certain features; but, it should be recognized and understood by those skilled in the art that the invention applies equally well to prior art SPMs with sufficient capacity to produce the necessary supplemental motion drive waveforms.

Figure 2:
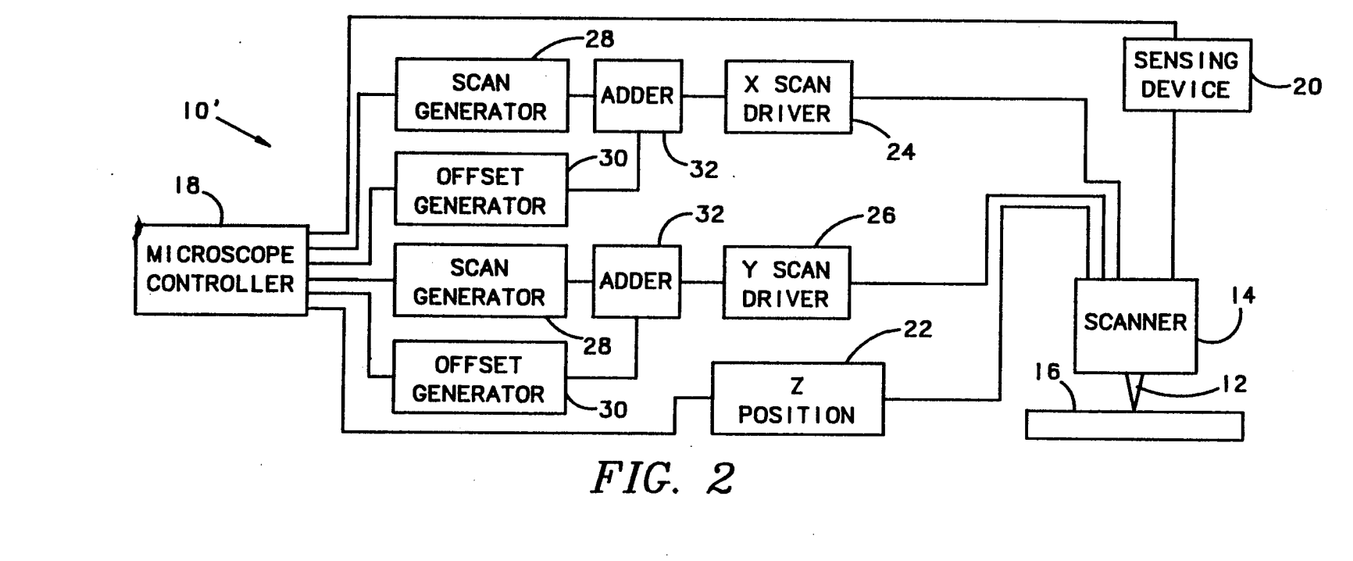
FIG. 2 is a block diagram illustrating an implementation of a probe positioning system in a scanning probe microscope according to the present invention.

FIG. 2 shows a scanning probe microscope (SPM) 10' which has been modified to practice the method of the present invention. The SPM 10' uses two position generators 28 and 30 for each axis, each of which can be independently controlled. The outputs of these generators are summed by the adder 32 before being input to the associated scan driver 24, 26. In the case of a raster scan image, it is convenient to think of the generators 28, 30 as scan and offset, respectively, although they can be used independently for any probe positioning pattern. The scan generators 28 can be driven with the appropriate waveforms for the raster and the offset generators 30 can be driven at an independent, typically slower, rate to generate a motion of the entire raster scan area. The offset generator 28 can be driven with a waveform that is computed by the controller 18, which may be a waveform for adding constant velocity motions or a waveform that will produce a motion whose velocity varies with time. The offset can be changed continuously or at the end of each scan line. In the case of some other probe positioning operation such as step and dwell for current/voltage measurements at a particular point, the scan generator 28 can be used for the probe positioning and the offset generator 30 can be used to move the probe with an independent motion, to drift the probe such that the probe is stationary with respect to the sample, i.e. to compensate for unwanted drift.

Figure 3:
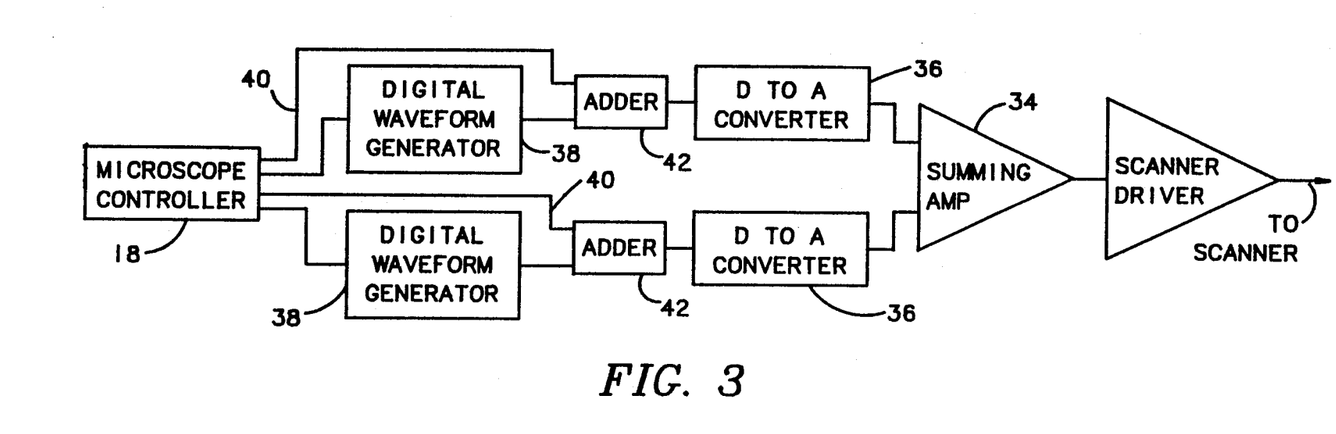
FIG. 3 is a partial functional block diagram of one hardware implementation of the invention.

The basic invention as described above and as depicted in FIG. 2 in simplified form can be implemented in various ways. One implementation, as illustrated in FIG. 3, is to sum as at 34 the outputs of two D to A converters 36 that have independent waveform generators 38 and control words (on line 40 from the controller 18) added at 42 as their inputs. Alternatively, the invention could be implemented in software or firmware with functions similar to those shown in FIG. 3 residing in a computing device or programmable logic device. Those skilled in the art undoubtedly will see other ways to implement the basic approach of the present invention depending on the configuration of their particular system.

Although the controlled motion applied to the scan area according to the present invention may be of any type, one particularly useful motion to apply would be a constant velocity vector in the x-y plane which is equal to a long-term unwanted drift velocity. The waveform used to generate this controlled motion of the scan area may be a non-linear waveform to compensate for the non-linear response of the piezoelectric scanner. Such a waveform is described in a co-pending application assigned to the common assignee of this application titled METHOD OF DRIVING A PIEZOELECTRIC SCANNER LINEARLY WITH TIME by Virgil B. Elings et al. (Ser. No. 344,750; filed 4/28/89). In general, the piezoelectric scanner characteristics should be considered when the waveform to create a desired motion of the scan area is generated since the voltage applied to the scanner 14 and the motion of the scanner 14 may not have a linear relationship.

Figure 4:
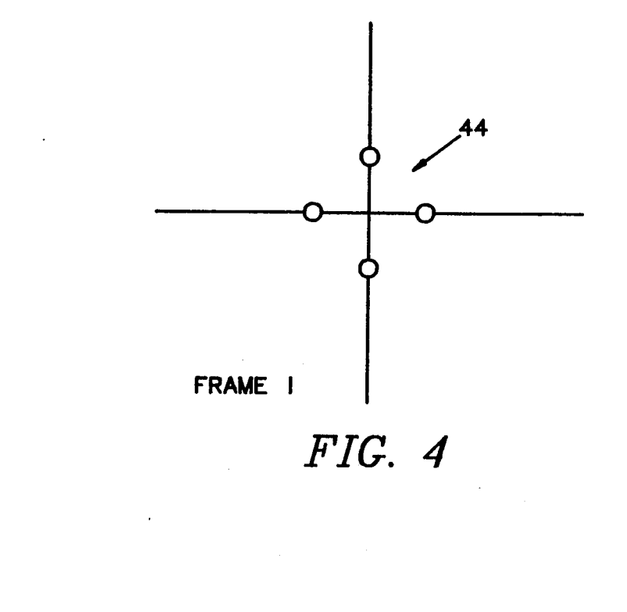
FIGS. 4 and 5 are an illustration of a manual motion detection and determination scheme according to the present invention.
Figure 5:
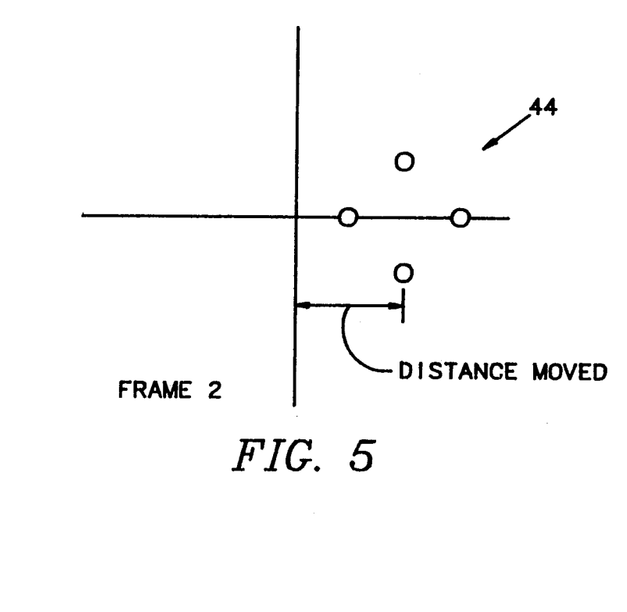

This invention coupled with a means to determine drift velocity provides active drift compensation. Determination of drift velocity may be accomplished by measuring the actual drift or by predicting the drift from known characteristics of the system. Methods have been developed by the inventors herein that use a semi-automated process for drift velocity determination. These methods involve operator interaction. The first method, as illustrated in FIGS. 4 and 5, works as follows. Once the operator is satisfied with the image he is scanning, a feature 44 is marked on an image frame as depicted in FIG. 4. The microscope is then allowed to continue to scan until that feature 44 has noticeably drifted. The feature 44 is then marked again on the next frame or some later frame. The microscope controller 18 then computes drift velocity from the distance the feature 44 has moved and the time which has elapsed between when the two marks were made (or, more accurately, the time between when the feature first marked was scanned and when the feature second marked was scanned). The controller 18 can then begin automatically drifting the scan using the controlled motion capability for successive frames. If the drift velocity changes with time, the operator can repeat the above-described process as needed.

In the second method, the operator simply enters drift velocities and changes the values until a stable image is visually achieved. The controller 18 continues to apply the last entered corrections until the drift compensation option is cancelled or new values are entered. Many drifts of concern are stable over long periods compared to the time required to scan one frame. This method would be useful, for example, where one is imaging a uniform structure of atoms in which the distortion due to drift can easily be visualized but a particular feature cannot be identified.

A third method would require the microscope controller 18 to have the ability to continuously repeat a single scan line in x, y, or any desired direction in the x-y plane, and while continuously repeating, to display the scan line data in signal versus time form. Drift would cause the signal to move across the display much like the display of an untriggered oscilloscope. One could then add in controlled drift until the signal stopped moving. This process would then be repeated for the other axis. A variation of this technique would be to simultaneously display the data from forward and reverse scans and add controlled drift until the two signals lined up with each other in time, indicating that sample drift is compensated for.

An alternative method to determine drift is a totally automated drift velocity determination scheme that is based on the shift in frequency of the scan spectrum caused by the drift velocity on scans of opposite direction. This method is implemented in two forms, one of which provides simple and accurate results on images with a high degree of spatial periodicity; and, the other which is somewhat more computationally intensive but can be invoked on image spectra with a less defined signature.

Figure 6:
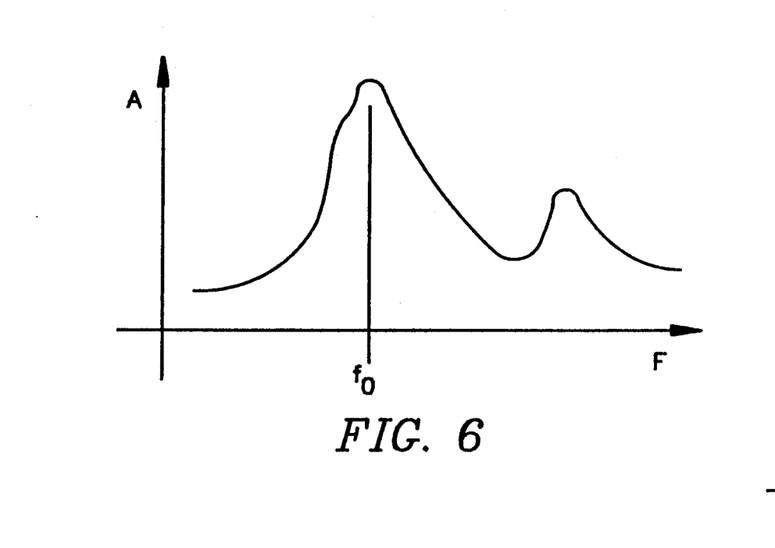
FIGS. 6–8 illustrate the logic of a bi-directional spectral shift scheme according to the present invention.
Figure 7:
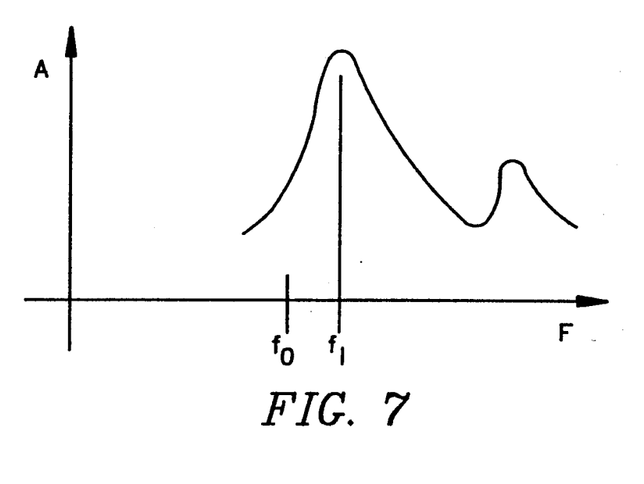
Figure 8:
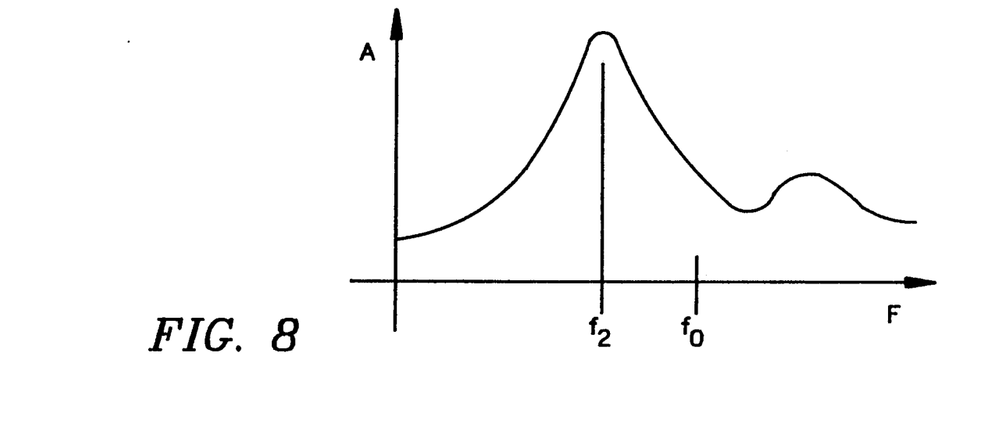

The principle behind this method is similar to the Doppler shift. Consider the data from a scanline as a function of time. If one were to take the Fourier Transform of this function, the resultant spectrum would be a representation of the spatial frequency distribution of features. In the case of an atomic image, for example, the spectrum would have large well-defined peaks corresponding to the atomic spacing. In the case of a more amorphous image, the spectrum would appear more like noise. Note that this method will not detect drift velocity accurately for images that have no defined spectral peaks and, therefore, should include error checking to prevent spurious compensations. For images that contain clearly definable features which is usually the case when drift is a problem, however, this method works well and allows for rapid automatic compensation. The effect of this method is illustrated in FIGS. 6–8. If there were no drift velocity component in a given scan direction, the spectra from two scans taken in opposite directions over the same scanline would be the same as depicted in FIG. 6. In the presence of a drift velocity vector in the scanline direction, corresponding points on the spectra as depicted in FIGS. 7 and 8 would be shifted by the following relationship:

$$\Delta f = f_o \left( 1 \pm \frac{v_d}{v_s} \right)$$

where:
- $f_o$ = spatial frequency point on spectrum with no drift velocity,
- $\Delta f$ = spatial frequency shift due to drift velocity,
- $v_s$ = scan velocity,
- $v_d$ = drift velocity, and
- in the $\pm$ term the + is the scan in the direction of drift and the − is the scan in the opposite direction.

After each scan is acquired, a Fourier Transform is computed for the scanline—for both forward and reverse scans. Two different schemes for computing drift velocity are presented. In the first scheme (which works well for atomic images or other images with well defined spectral lines) the peak value of the spectra are located for both positive and negative scans and the location of these peaks in frequency is used to calculate the drift velocity as shown in the following equation:

$$v_d = v_s \frac{f_1 - f_2}{f_1 + f_2}$$

where:
- $f_1$ = location of peak for forward scan
- $f_2$ = location of peak for reverse scan Any identifiable peak could be used for this calculation: and, more than one peak could be used and the results averaged for greater accuracy. Alternatively, the shift in the 90% power point (or any clearly identifiable point on the spectrum) could be used as well for the drift calculation.

An alternative calculation, which is less intuitive but yields good results is based on an analysis of the total spectrum and uses the fact that the total amplitude of the spectra is the same for both positive and negative scan. This calculation will detect drift velocity for images with less well-defined spectral peaks than the above scheme; but, is more computationally intensive. This calculation is shown below:

$$\vec{A}(f) = \text{amplitude for frequency } f \text{ in forward scan}$$
$$\overset{\leftarrow}{A}(f) = \text{amplitude for frequency } f \text{ in reverse scan}$$

define
$$\vec{S}(f) = \Sigma \vec{A}(f)$$
$$\overset{\leftarrow}{S}(f) = \Sigma \overset{\leftarrow}{A}(f)$$
$$\vec{K}(f) = \Sigma \log(f)\vec{A}(f)$$
$$\overset{\leftarrow}{K}(f) = \Sigma \log(f)\overset{\leftarrow}{A}(f)$$

$$x = \frac{\overset{\leftarrow}{K}(f)}{\overset{\leftarrow}{S}(f)} - \frac{\vec{K}(f)}{\vec{S}(f)}$$

$$= \log \pm \left( \frac{1 + \frac{v_d}{v_s}}{1 - \frac{v_d}{v_s}} \right)$$

then $$v_d = v_s \left( \frac{e^x - 1}{e^x + 1} \right)$$

Both schemes can be used effectively and the choice depends on the type of image. For both, the actual tested implementation also checks for drift velocities of unusually high value or very rapid changes in drift velocity. If either occurs, the operator is informed that automatic drift compensation is not possible for the particular image.

Another automatic method that will yield good results for images with no defined spectral peaks has been developed. This method is more computationally intensive than either of the above. This method is based on cross correlating scanlines in two scan directions from different image frames. Using x and y as the scan directions (as an example), the two dimensional correlation function used in this method is defined as follows:

$$C_{1xy2xy} = f_{2d}(f_{2d}(x_1,y_1)^* f_{2d}(x_2,y_2))$$

where
- $(x_1,y_1)$ = scanlines in x,y on frame 1
- $(x_2,y_2)$ = scanlines in x,y on frame 2
- $f_{2d}$ = 2 dimensional Fourier transform The offset in the peak of this function gives the magnitude and direction of the drift. This method can also be implemented by computing the one dimensional correlation functions separately; then, the magnitude and offset of these functions will give the x and y drift respectively. This technique could be used for any scan directions. Note, however, that this method does not work well for images with highly periodic spatial features as the correlation function for periodic functions is periodic. On the other hand, the frequency shift methods described above will yield very good results for periodic images. The correlation method is computationally intensive and requires significant computing resources to achieve real-time operation. This method is used for automatic drift compensation of images without well-defined spectral peaks.

In a preferred implementation, the selection of which method to use for a particular sample could be done automatically by the instrument. Additionally, it is preferred that the instrument check for success of the drift correction method employed and provide an alarm to a user if the correction is not successfully correcting for drift within pre-established tolerance limits.

The above methods apply to long-term drifts that are relatively constant over the time interval to scan an image. Some drifts, such as the drift due to piezoelectric creep that occurs after a scan area has been offset, are not constant with time; but, rather, have a strong time dependence that has significant variation over single images. Such drifts cannot be conveniently measured; but, may be compensated for if the drift characteristics can be predicted. The drift due to piezoelectric creep is generally predicted to be proportional to the size of the motion, and to decrease logarithmically with time. For example, one manufacturer of piezoelectric actuators describes the drift due to this effect with the following formula:

$$\Delta L(t) = \Delta L(1 + \gamma \log t/\alpha)$$

where $\gamma$ and $\alpha$ are constants that vary with the material and the scanner configuration, and $\Delta L$ is the initial scanner position offset.

If one differentiates the relationship for $\Delta L(t)$, the following relationship exists:

$$d\Delta L(t)/dt = (\Delta L\gamma)/(\alpha^2 t)$$

which is a relationship for drift velocity that is a non-linear function of time. A waveform that is described by this relationship can be used to drive the offset generator 30 in FIG. 2 to cause a controlled motion that is opposite to the expected drift motion. This is an example of predicting a drift velocity and applying a non-linear waveform to correct for it.

In summary, what has been described hereinbefore is a scanning probe microscope in which the probe can be moved independent of the scanning movement. This independent motion may be used to remove drift in the image and, therefore, increase the utility of the instrument and reduce measurement time. Several alternative methods are presented to determine the drift velocity so that the determination can be used by the instrument to cancel the drift.

Wherefore, having thus described the present invention, what is claimed is:

1. In a scanning probe microscope system wherein a probe carried by piezoelectric positioning apparatus subject to drift motion over the width of a scan pattern is positioned in at least two perpendicular dimensions by the application of a positioning signal to the positioning apparatus for each of the two dimensions to create a scan pattern of the probe, the method of providing supplemental movement to the probe to offset the drift motion of the piezoelectric positioning apparatus comprising the steps of:
   a) applying a first supplemental signal which defines supplemental motion in a first one of the two dimensions to the positioning apparatus in conjunction with the positioning signal for a first one of the two dimensions; and,
   b) applying a second supplemental signal which defines supplemental motion in a second one of the two dimensions to the positioning apparatus in conjunction with the positioning signal for the second one of the two dimensions; wherein,
   c) said steps of applying a first supplemental signal and applying a second supplemental signal include providing supplemental signals which define a controlled drift of the scan pattern.

2. The method of claim 1 wherein said step of applying a second supplemental signal comprises:
   applying the second supplemental signal simultaneously with the first supplemental signal.

3. The method of claim 1 wherein:
   the supplemental signals are produced from a non-linear waveform which results in linear motion of the probe over the width of a scan pattern.

4. The method of claim 1 wherein additionally:
   said step of providing supplemental signals which define a controlled drift in the raster scan pattern includes providing as part of the supplemental signals compensation motion of the probe which compensates for motion-caused distortion whereby the probe can be used to automatically scan a large area of the surface to be scanned while high resolution is maintained.

5. The method of claim 1 wherein:
   a) the application of the positioning signal to the positioning apparatus for each of the two dimensions is used to create a scan pattern of the probe over a section of a surface to be scanned; and,
   b) the positioning apparatus is subject to unwanted long-term drift that is relatively constant over the time required to scan a single image; and additionally comprising the step of,
   c) determining the unwanted long-term drift; wherein,
   d) said steps thereof include providing supplemental signals which offset the unwanted long-term drift.

6. The method of claim 5 wherein said step of determining the unwanted long-term drift comprises the steps of:
   a) having an operator mark a significant feature on a scan frame at a first point in time;
   b) having the operator mark the significant feature on a later scan frame at a second point in time; and,
   c) having an electronic controller of the scanning probe microscope system calculate the drift velocity vector of the significant feature over the elapsed time between the first and second points in time.

7. The method of claim 5 wherein said steps thereof include the steps of:
   a) having an operator enter a compensation factor used to develop supplemental signals; and,
   b) repeating step (a) until a significant feature does not drift between first and second points in time.

8. The method of claim 5 wherein said steps thereof include the steps of:
   a) displaying data from a continuously scanned single line in a first dimension;
   b) having an operator enter a first compensation factor used to develop a first supplemental signal;
   d) having the operator adjust the first compensation factor until data displayed is stationary;
   e) displaying data from a continuously scanned single line in a second dimension;
   f) having the operator enter a second compensation factor used to develop a second supplemental signal; and,
   g) having the operator adjust the second compensation factor until data displayed is stationary.

9. The method of claim 5 wherein said steps thereof include the steps of:
   a) continuously and simultaneously displaying data from forward and reverse scans of a scanned single line in a first dimension;
   b) having an operator enter a first compensation factor used to develop a first supplemental signal;
   c) having the operator adjust the first compensation factor until data displayed is stationary;

d) continuously and simultaneously displaying data from forward and reverse scans of a scanned single line in a second dimension;

e) having the operator enter a second compensation factor used to develop a second supplemental signal; and, f) having the operator adjust the second compensation factor until data displayed is stationary.

10. The method of claim 5 wherein said steps thereof include the steps of:

a) continuously comparing data from forward and reverse scans of scanned lines in a first dimension on a frame by frame basis;

b) automatically adjusting a first compensation factor used to develop a first supplemental signal on a frame by frame basis so as to compensate for drift in the first dimension during the preceding frame;

c) continuously comparing data from forward and reverse scans of scanned lines in a second dimension on a frame by frame basis; and, d) automatically adjusting a second compensation factor used to develop a second supplemental signal on a frame by frame basis so as to compensate for drift in the second dimension during the preceding frame.

11. The method of claim 5 and additionally comprising the step of:

determining drift velocity from a shift in spectral frequency caused by the effect of the drift velocity on data taken from forward and reverse scans.

12. The method of claim 5 and additionally comprising the step of:

determining drift velocity from the shift in frequency of specific spectral peaks contained in data taken from forward and reverse scans.

13. The method of claim 12 wherein:

drift velocity, $v_d$, is given by:

$$v_d = v_s \frac{f_1 - f_2}{f_1 + f_2}$$

where:

$f_1$ = location of peak for forward scan
$f_2$ = location of peak for reverse scan
$v_s$ = scan velocity 14. The method of claim 12 wherein:

drift velocity, $v_d$, is determined from the scan velocity, $v_s$, by the following relationship:

$\overset{>}{A}(f)$ = amplitude for frequency $f$ in forward scan
$\overset{<}{A}(f)$ = amplitude for frequency $f$ in reverse scan define $\overset{>}{S}(f) = \Sigma \overset{>}{A}(f)$
$\overset{<}{S}(f) = \Sigma \overset{<}{A}(f)$
$\overset{>}{K}(f) = \Sigma \log(f) \overset{>}{A}(f)$
$\overset{<}{K}(f) = \Sigma \log(f) \overset{<}{A}(f)$ $$x = \frac{\overset{>}{K}(f)}{\overset{>}{S}(f)} - \frac{\overset{<}{K}(f)}{\overset{<}{S}(f)}$$

$$= \log \pm \left( \frac{1 + \frac{v_d}{v_s}}{1 - \frac{v_d}{v_s}} \right)$$

then $$v_d = v_s \left( \frac{e^x - 1}{e^x + 1} \right)$$

15. The method of claim 5 and additionally comprising the step of:

determining drift velocity in the absence of defined spectral peaks by cross correlating scanlines in two scan directions from different image frames according to the relationship:

$$C_{1xy2xy} = \mathcal{f}_{2d}(\mathcal{f}_{2d}(x_1,y_1) * \mathcal{f}_{2d}(x_2,y_2))$$

where $(x_1,y_1)$ = scanlines in x,y on frame 1
$(x_2,y_2)$ = scanlines in x,y on frame 2, which is successive to frame 1
$\mathcal{f}_{2d}$ = 2 dimensional Fourier transform and where the offset in a peak of this function gives the magnitude and direction of the drift.

16. The method of claim 5 and additionally comprising the step of:

determining drift velocity according to the relationship:

$$\Delta f = f_o \left( 1 \pm \frac{v_d}{v_s} \right)$$

where:

$f_o$ = spatial frequency point on spectrum with no drift velocity,
$\Delta f$ = spatial frequency shift due to drift velocity,
$v_s$ = scan velocity,
$v_d$ = drift velocity, and
in the ± term the + is the scan in the direction of drift and the − is the scan in the opposite direction.

17. The method of claim 5 and additionally comprising the steps of:

a) automatically and continually checking for success within pre-established limits of drift correction being applied; and, b) providing an alarm to a user if the drift correction is not successfully correcting for drift.

* * * * *